(12) United States Patent
La Sorda

(10) Patent No.: US 8,932,385 B2
(45) Date of Patent: Jan. 13, 2015

(54) APPARATUS AND METHOD FOR METAL SURFACE INERTION BY BACKFILLING

(75) Inventor: Terence D. La Sorda, Norristown, PA (US)

(73) Assignee: Air Liquide Industrial U.S. LP, Houston, TX (US)

( * ) Notice: Subject to any disclaimer, the term of this patent is extended or adjusted under 35 U.S.C. 154(b) by 0 days.

(21) Appl. No.: 13/281,882

(22) Filed: Oct. 26, 2011

(65) Prior Publication Data

US 2013/0104699 A1 May 2, 2013

(51) Int. Cl.
*C22B 9/05* (2006.01)
*F27B 5/04* (2006.01)
*F27D 11/06* (2006.01)
*F27D 99/00* (2010.01)

(52) U.S. Cl.
CPC ... *C22B 9/05* (2013.01); *F27B 5/04* (2013.01); *F27D 11/06* (2013.01); *F27D 2099/0015* (2013.01)
USPC .......... 75/709; 75/589; 75/600; 75/663; 75/678

(58) Field of Classification Search
USPC .............. 75/600, 602, 678, 680, 686, 709
See application file for complete search history.

(56) References Cited

U.S. PATENT DOCUMENTS

| | | | |
|---|---|---|---|
| 2,113,021 A * | 4/1938 | Greenidge et al. | 420/580 |
| 4,424,853 A | 1/1984 | Khandros et al. | |
| 4,448,616 A | 5/1984 | Francis, Jr. et al. | |
| 4,614,216 A | 9/1986 | Savard et al. | |
| 4,770,697 A | 9/1988 | Zurecki | |
| 4,781,122 A | 11/1988 | Foulard et al. | |
| 4,806,156 A | 2/1989 | Anderson et al. | |
| 4,828,609 A | 5/1989 | Anderson et al. | |
| 4,848,751 A | 7/1989 | Lutgen et al. | |
| 5,211,744 A | 5/1993 | Areaux et al. | |
| 5,404,929 A * | 4/1995 | Till | 164/66.1 |
| 5,609,481 A | 3/1997 | Kobayashi | |
| 6,228,187 B1 | 5/2001 | Till | |
| 6,491,863 B2 | 12/2002 | Jepson | |
| 7,290,588 B2 | 11/2007 | Erhard et al. | |
| 2006/0054300 A1 * | 3/2006 | Kennedy | 164/490 |
| 2008/0182022 A1 | 7/2008 | La Sorda | |
| 2009/0136884 A1 * | 5/2009 | Jepson | 432/14 |

FOREIGN PATENT DOCUMENTS

| | | | | |
|---|---|---|---|---|
| DE | 3109066 A1 * | 9/1982 | | C22B 26/22 |
| JP | 58020369 | 2/1983 | | |

OTHER PUBLICATIONS

Best et al., "Gas and Cryogen Swirling Methods for Inerting Molten Metal Surfaces," International News Magazine of the Investment Casting Institute.

(Continued)

*Primary Examiner* — Kaj K Olsen
*Assistant Examiner* — Jared Wood
(74) *Attorney, Agent, or Firm* — Allen E. White; Elwood L. Haynes

(57) ABSTRACT

The disclosure provides a method and apparatus for inerting the surface of a metal charge in an induction furnace. The process generally involves use of a porous plug positioned near the surface of the metal charge. Argon (or other blanket gases) is flushed through the porous plug to back fill the volume of the induction furnace above the metal charge with an inert gas.

28 Claims, 2 Drawing Sheets

(56) References Cited

OTHER PUBLICATIONS

Hillis, "The International Program to Identify Alternatives to SF6 for Magnesium Melt Protection," International Conference on SF6 and the Environment: Emission Reduction Strategies, Nov. 21-22, 2002, San Diego, CA.

Milbrath, "3M Novec 612 Magnesium Protection Fluid," International Conference of SF6 and the Environment, Dec. 1-3, 2004.

Praxair, Laminar Barrier Inerting (LBI) Technology.

Report on Carcinogens, Eleventh Edition, "Hexachloroethane CAS No. 67-72-1".

U.S. Department of Energy, "Degassing of Aluminum Alloys Using Ultrasonic Vibrations," Apr. 2003.

Xiang et al., "Numerical Analysis on Porous Shunt Used in Magnesium Alloy Furnace," Advanced Materials Research vols. 102-104 (2010), pp. 88-92.

* cited by examiner

APPARATUS AND METHOD FOR METAL SURFACE INERTION BY BACKFILLING

TECHNICAL FIELD

This disclosure relates to methods of operating melting furnaces primarily for magnesium or aluminum alloy melting.

BACKGROUND ART

Many metal alloys when melted react with one or more atmospheric gases to yield undesirable reaction products. Magnesium for example burns in the presence of atmospheric oxygen. Aluminum reacts with atmospheric oxygen to form a dross layer of aluminum oxide. Both metals may be melted in closed, indirectly fired or resistance furnaces. These furnaces are open to the atmosphere only for short periods of time to withdraw portions of the melt body for casting.

The standard techniques in the art for protecting magnesium and aluminum melts in these closed furnaces have various drawbacks. Magnesium melts are most often protected by a blanketing atmosphere containing sulfur hexafluoride, $SF_6$. Sulfur hexafluoride is a greenhouse gas and is being phased out of use in the United States due to government regulations. An alternative blanketing gas is sulfur dioxide, $SO_2$. Sulfur dioxide is a toxic gas with government mandated exposure limitations. Sulfur dioxide also contributes to acid rain and particulate pollution and is therefore subject to environmental regulations. Sulfur dioxide is consequently difficult to use in magnesium melting furnaces in practice. Inert atmospheres such as Argon gas blankets have been attempted for Magnesium melts. The difficulty with applying an inert atmosphere is that Magnesium coats the surfaces of the furnace over time. Because the furnace must be opened to remove Magnesium, e.g. with a ladle, the argon atmosphere is compromised. The Magnesium on some surfaces then becomes exposed to air and burns violently. One solution has been the replacement of sulfur hexafluoride with other fluorine compounds having more environmentally favorable properties. One such replacement compound is $C_3F_7C(O)C_2F_5$, sold by 3M under the name NOVEK 612™. This replacement chemical forms a dense cover gas analogous to sulfur hexafluoride. NOVEK 612™ is limited in that it should not be used with the standard dry air atmosphere but should be supplied to the furnace in a carrier gas of 80-95% carbon dioxide with the balance being dry air. NOVEK 612™ is manufactured exclusively by 3M and consequently the supply is limited. There is thus a need for a more readily accessible alternative having multiple sources.

In closed, indirectly fired or resistance furnaces used for Magnesium, there is therefore a need for an effective alternative to the presently available inert gas protection techniques.

Aluminum melts are both protected prior/during melting and treated after melting to reduce atmospheric contaminants, particularly hydrogen and oxygen. Oxygen reacts to form a dross of Aluminum Oxide. Hydrogen derives from atmospheric water vapor and dissolves into molten Aluminum. Protection from atmospheric gases prior to and during melting may include purging the empty furnace with Nitrogen or Argon gas and maintaining the enclosed furnace space with the same inert atmosphere. See, e.g., U.S. Pat. No. 5,211,744. This is generally followed by a degassing flux such as argon and/or nitrogen bubbled through the aluminum to remove hydrogen and other impurities. The protective atmosphere of inert gas may be maintained by the same gas injections systems used for degassing. Active degassing has in the past been performed using a source of Chlorine such as Hexachloroethane tablets. Active degassing agents have become difficult to use in practice due to environmental and safety concerns. A drawback to using inert gas atmospheres is excessive cost in part because of the volume of gas required to effectively reduce dissolved hydrogen levels and dross formation.

In closed, indirectly fired or resistance furnaces used for Aluminum, there is therefore a need for an effective alternative to the presently available protection techniques.

Existing solutions to inerting of molten metal surfaces fall into two categories: liquid cryogen delivering and gaseous atmosphere blankets. Delivering the inerting cryogen to cover the surface of the molten metal is a superior technique in certain contexts. Such technologies are described in:

U.S. Pat. No. 6,491,863 B2, Stewart C. Jepson, Method and Apparatus for Efficient Utilization of a Cryogen for Inert Cover in Metals Melting Furnaces, Dec. 10, 2002.

U.S. Pat. No. 4,806,156, Sara H. Anderson, Noel F. Lutgen, Process for the Production of a Bath of Molten Metal or Alloys, Feb. 21, 1989.

U.S. Pat. No. 4,848,751, Noel F. Lutgen, Sara Hornby-Anderson, Lance for Discharging Liquid Nitrogen or Liquid Argon into a Furnace Throughout the Production of Molten Metal, Jul. 18, 1989.

Gas blanket protection is also available commercially through offers such as the PRAXAIR™ Laminar Barrier Inerting (LBI) technology and AIR PRODUCTS™ swirl cone technology.

Both categories of solution use costly inert gas, generally Argon. Thus there is a continuing need to devise new methodologies for delivering inerting gas that reduce gas utilization while maintaining the requisite degree of inertion, generally measured as a target maximum oxygen level at the molten metal surface.

SUMMARY OF THE DISCLOSURE

The disclosure may be summarized in part by the following numbered sentences:

1. A method of providing an inerting atmosphere (100) to a body of molten magnesium, lithium, zinc, silicon, aluminum or other metal or metal alloy (40) in an indirect fired or resistance furnace (10, 30), the molten metal or metal alloy (40) being reactive to air, water and/or other constituents in air (60), the method comprising the steps of:
   a) forming a flow of an inerting gas (100) within the furnace (10) from a flow initiation position (90) within the furnace that is:
      i) in a proximity of a surface (50) of a solid metal charge or molten metal body (40) in the furnace (10),
   b) controlling a flow rate of the inerting gas flow (100) to produce a passive backfilling of a volume (60) from the surface of the molten and/or heated metal (50) to a working lid (20) of the melting furnace (10).
2. The method of sentence 1 wherein the melting furnace (10) is open to the external atmosphere (20) for no more than a maximum period of time after which the surface of the molten and/or heated metal (50) would experience a concentration level of air and/or other constituents in air (60) that is higher than a predetermined maximum level.
3. The method of sentence 1 or 2 wherein the molten metal body (40) is a magnesium alloy.

4. The method of sentences 1-3 wherein the predetermined maximum level is an oxygen concentration in the atmosphere (60) in contact with the surface of the molten metal, the maximum being at or below 800 ppm, preferably below 700 ppm.

5. The method of sentences 1 or 2 wherein the molten metal body (40) is an aluminum alloy.

6. The method of sentence 5 wherein the predetermined maximum level is an oxygen concentration in the atmosphere (60) in contact with the surface of the molten metal, the maximum being at or below 800 ppm, preferably below 700 ppm.

7. The method of any one of the preceding sentences wherein the inerting gas (100) comprises argon.

8. The method of any one of the preceding sentences wherein, prior to forming the flow, the inerting gas (70) is at or below ambient temperature relative to the internal temperature of the melting furnace (10).

9. The method of any one of the preceding sentences wherein the inerting gas flow (100) emanates from one or more porous plugs (90) at one or more flow initiation positions.

10. The method of sentence 9 wherein the inerting gas (100) is delivered to the porous plug or plugs (90) at a pressure of 137 kPa to 275 kPa.

11. The method of any one of the preceding sentences wherein the maximum period the lid (20) is open to the external atmosphere is from 1 to 3 minutes.

12. The method of any one of the preceding sentences wherein the inert gas flow rate (100) is 0.25 to 100 SCF per minute, preferably 1 to 30 SCF per minute.

13. The method of any one of the preceding sentences wherein the porous plug (90) has a micron level of 1 to 200 microns.

14. The method of any one of the preceding sentences wherein the inert gas flow rate (100) is increased when the lid 20 is in an open position.

15. An apparatus suitable for inerting a surface (50) of a molten metal body (40) comprising:
 a) A supply of inerting gas (70),
 b) A porous plug (90)
 c) A tube (80) in fluid communication with the inert gas supply (70) and the porous plug (90) and configured to transport inert gas from the supply (70) to the porous shunt (90),
 d) A drop shroud (95) fixed to the tube (80) and porous plug (90), the drop shroud positioned at the junction of the tube (80) and the porous plug (90) to be capable of shielding the porous plug (90) from objects falling from above the porous plug (90).

16. The apparatus of sentence 15 wherein the inerting gas (100) comprises argon.

17. The apparatus of any one of the preceding sentences wherein the porous plug (90) has a micron level of 1 to 200 microns.

18. The apparatus of any one of the preceding sentences wherein the porous plug (90) comprises stainless steel and/or a ceramic material, the porous plug (90) being adapted to function at an operational temperature of an induction melting furnace (10).

19. An induction furnace (10) having a solid metal charge of molten metal body (40) with a surface (50), the induction furnace (10) further comprising the apparatus of sentences 15-18.

20. The induction furnace (10) of sentence 19, wherein the porous plug (90) is in a proximity of a surface (50) of a solid metal charge or molten metal body (40) in the furnace (10).

21. A metal object produced by the process of sentences 1-14.

DISCLOSURE OF INVENTION

An improved method of providing an inerting atmosphere (SBAL™) to a body of molten metal in a closed, indirect fired or resistance furnace is generally achieved by backfilling a volume of inert gas directly above and in contact with the surface of the molten metal, which displaces the air and air constituents away from the molten and/or heated metal. The inert gas protects the surface of the metal from the upper portion of the atmosphere in the furnace, which may have for example substantial amounts of dry air. This eliminates the engulfment of air that occurs when the inert gas is introduced at or above the lip of the melting furnace containment system, as is done in previous gaseous inert blanketing techniques. The inert gas is capable of protecting the molten metal in the closed furnace during a normal melt cycle, and for the periods of time when the furnace lid is open for adding charge, adding alloying elements, sampling for compositional analysis and ladling the molten metal for casting. Thus for most closed furnace operations, the backfilling of inert gas at the surface of molten and/or heated metal is an efficient and effective means of protecting molten metals from atmospheric gases.

"Magnesium Alloy" is defined as a metal alloy with magnesium as the primary element in greater concentration than any other element of the alloy.

"Aluminum Alloy" is defined as a metal alloy with aluminum as the primary element in greater concentration than any other element of the alloy.

"Closed Furnace" is defined as a furnace with both main and partial top lids closed. There is no gross opening to the atmosphere. However it is not hermetically sealed.

"Open to the external atmosphere" is defined as a furnace with either the main or partial top lid in the open position.

"In a proximity of a surface" is defined as being closer to a solid metal charge or molten metal body surface in a furnace than to a lid of the furnace. It is preferred that the distance be no less than 1 centimeter and no more than 10 meters above the surface, such as between 10 cm and 5 m, 10 cm and 2 m, or any possible subrange or specific distance within 1 cm and 10 m. The controlling parameter is the ability to maintain the desired inert gas atmosphere at the surface of the metal. The exact distance defining "a proximity" will therefore need to be empirically evaluated for any specific furnace.

Inert Gas

Inert gases may be any gas that does not react with or dissolve into the molten metal. Common examples of inert gases are carbon dioxide, argon and nitrogen. Dehumidification to eliminate most or all water vapor may be required depending on the metals and the inert gas supply.

Apparatus for Backfilling Inert Gas Within A Furnace

Inert Gas Source

The inert gas source may be any device or container known in the art that is capable of providing inert gas for the blanketing flow. Generally, the inert gas source will be an industrial storage tank containing liquefied gas under pressure. Pipes, valves, regulators, pressurizing pumps, vaporizers and so forth may be employed to produce and direct a flow of inert gas for the blanketing flow.

Porous Diffusion Shunt

Porous diffusion shunts or plugs for delivering gases are generally known in the art. The porous diffusion shunt of the present invention should be capable of withstanding the conditions of operation, in particular the temperature experienced by the shunt in proximity to the molten metal. Materials such as stainless steel and certain ceramics are known in the art as both suitable for porous diffusion shunts and for high temperature environments. A feature of this improvement is the low pressure to flow ratio of the inert gas which allows for a low turbulence introduction of the inert gas to the surface of the molten and/or heated metal, alloy or element. The inert gas blanket quickly and gently backfills from the surface of the molten and/or heated metal, alloy or element and displaces the damaging constituents of the air away from the surface. The displacement action is enhanced due to the introduction of relatively cooler inert gas to the heated atmosphere of the furnace and/or containment system.

Porous Diffusion Shunt Drop Shroud

An important feature of the SBAL™ lance system is the drop shroud. The drop shroud protects the porous plug from dropping heated and/or molten charge material during the melt cycle of the furnace. The drop shroud also directs the inert gas flowing from the porous plug to flow along the surface of the melt line. The low pressure/high flow ratio of the dense gaseous inert gas flowing from the porous plug, coupled with the high physical density of gas keeps the inert gas at a protective position along the melt surface as the inert gas flows away from the vicinity of the drop shroud.

Generally Applicable, Exemplary Operating Parameters:
Porous plug with micron levels of 1 to 200 microns
General Temperature ranges for porous shunts or plugs:
   175 to 816 degrees C. for Stainless Shunts
   816 to 2205 degrees C. for Ceramic Shunts.
General Operating Inert Gas Pressure: 137 kPa to 275 kPa
General Inert Gas Flow Rate: 0.25 to 100 SCF per minute, preferably 1 to 30 SCF per minute.

The flow rate is dependent in part on the size of the furnace and the integrity of the furnace lid. Generally, a gas flow with minimal turbulence, ideally a laminar flow, emanates from one or more dispensation points to expand across the metal surface. Consideration must also be made in the location of the flow initiation position(s) to the charge melt dynamics to prevent shunt or plug contact with the heated or molten metal. The number of flow initiation positions is dependent on the size of the melting furnace, the make-up and density of the charge, and the integrity of the furnace lid.

MODE(S) FOR CARRYING OUT THE INVENTION

Figure 1:
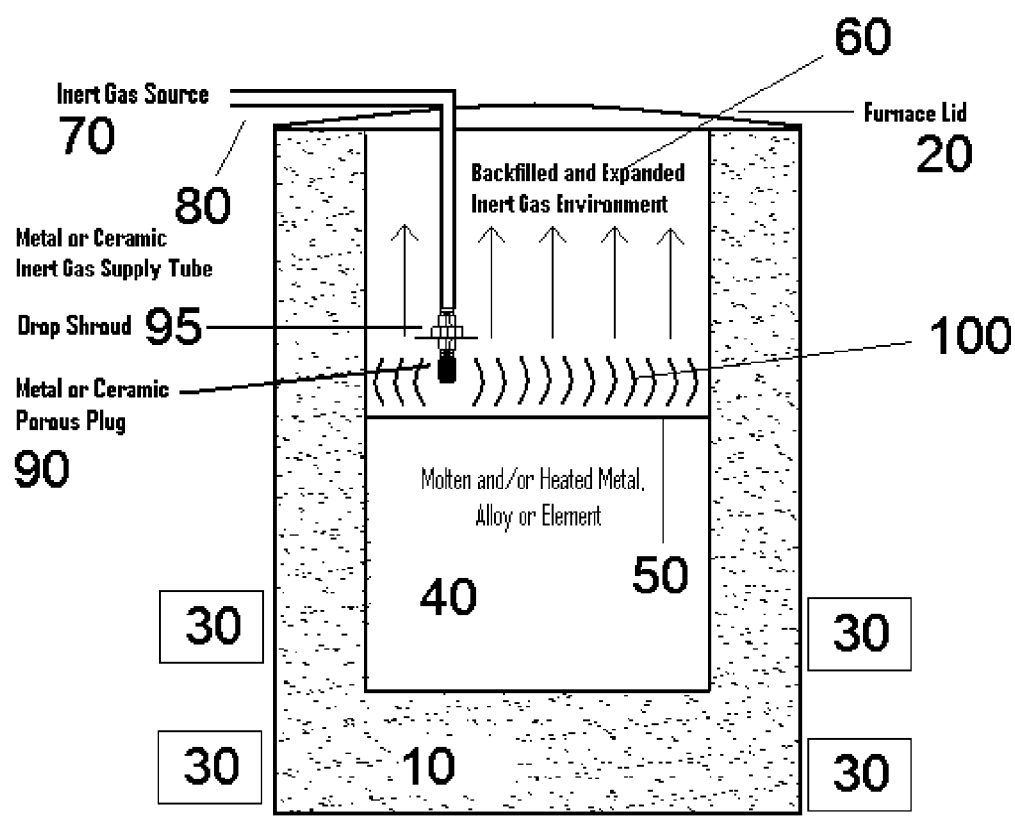
FIG. 1 shows an example of a furnace having a laminar flow formed by an example apparatus.

An exemplary embodiment of the invention is illustrated by FIG. 1. Furnace 10 with lid 20 is heated by external heat sources 30. Molten metal 40 is contained in the bottom of furnace 10. Molten metal 40 has a surface 50 exposed to a gaseous atmosphere 60. Inert gas source 70 supplies a cold inert gas under pressure to supply lance 80. The inert gas (argon, nitrogen, or carbon dioxide) supply lance 80 is designed to introduce the inert gas just above the surface of the molten and/or heated metal, alloy or element. The number of supply lances (80) required is dependent on the geometry of the environment that needs the inert gas blanket protection. FIG. 1 displays a one lance option. The constant flow of inert gas 100 from the lance being colder and denser than the atmosphere in the furnace, containment, or transfer system constantly displaces the atmosphere at the surface, which keeps the atmospheric constituents from interacting with the molten and/or heated metal, alloy or element in the system. This eliminates the engulfment of air that occurs when an inert gas is introduced at the top of the furnace or containment system. The inerting gas layer 100 will form a gradient of reducing concentration in the direction of the arrows shown in FIG. 1 due to constant leakage of inert gas out of the furnace and air into the furnace. The porous plug 90 with drop shroud 95 at the end of the lance facilitates a low pressure to flow ratio of the inert gas and allowing for low turbulence introduction.

Figure 2:
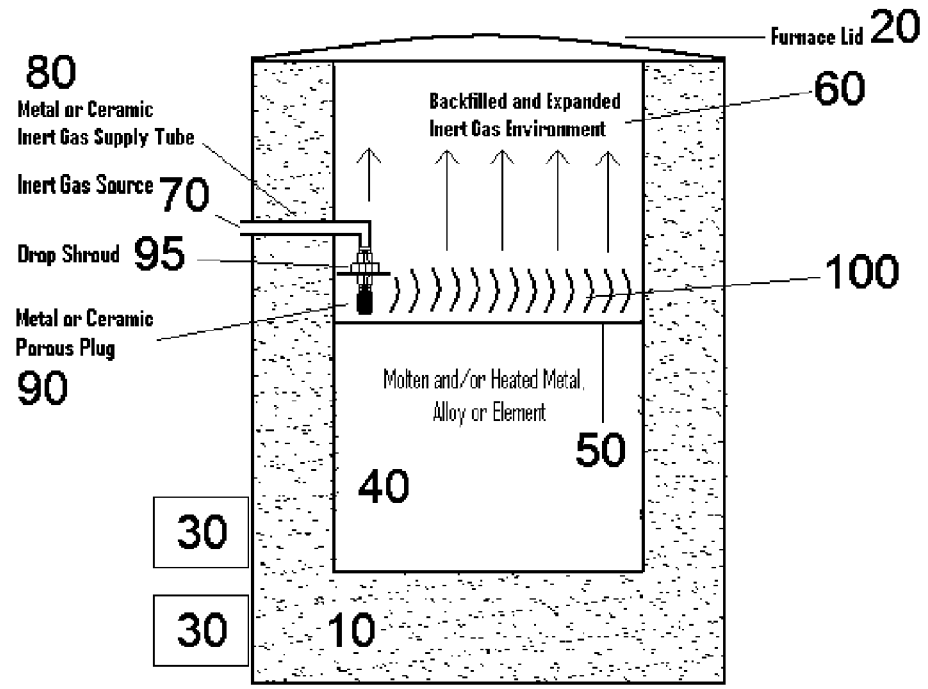
FIG. 2 shows a second example of a furnace having a laminar flow formed by an example apparatus.

FIG. 2 illustrates an alternative configuration. The inert gas (argon, nitrogen, or carbon dioxide) supply lance 80 goes through the side wall 10 of the metal containment system, and is designed to introduce the inert gas just above the surface of the molten and/or heated metal, alloy or element 50. The number of supply lances 80 required is dependent on the geometry of the environment that needs the inert gas blanket protection. FIG. 2 displays a one lance option. As in FIG. 1, the constant flow of inert gas 100 from the lance being colder and denser than the atmosphere 60 in the furnace, containment, or transfer system constantly displaces the atmosphere at the surface, which keeps the atmospheric constituents from interacting with the molten and/or heated metal, alloy or element in the system. This eliminates the engulfment of air that occurs when an inert gas is introduced at the top of the furnace or containment system. The porous plug at the end of the lance facilitates a low pressure to flow ratio of the inert gas and allowing for low turbulence introduction.

In operation, the flow rate of inert gas 100 is adjusted to produce a desired level of oxygen at the metal surface 50. Oxygen sensors for evaluating oxygen levels are well known in the art. When lid 20 is open to the external atmosphere, the rate of leakage and external air infiltration will increase. The period for which the lid 20 may be open without exceeding the desired oxygen levels may be empirically measured using the same oxygen sensors for example. The flow rate of inert gas 100 may be increased during the period lid 20 is open.

In either configuration the system is capable of providing an inert blanket protection whether the furnace or containment system has a lid or not. A higher inert gas flow rate will be required for a furnace system without a lid.

Figure 3:
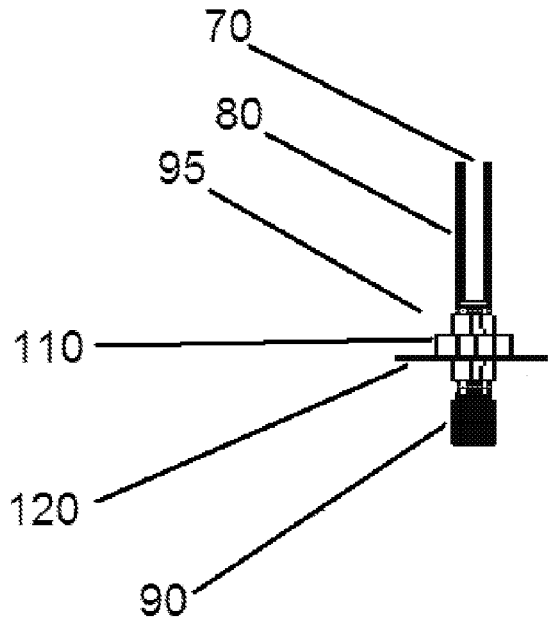
FIG. 3 shows a detail drawing of a porous shunt design suitable for some embodiments of the invention.

An exemplary embodiment of a porous diffusion shunt 90, suitable for certain embodiments of the invention, is illustrated by FIG. 3. The design in FIG. 3 is a welded assembly of a stainless washer 120 and a stainless pipe union 110. In this design, the body of the washer protects the porous plug from dropping heated or molten charge material during the melt cycle. The tube/supply lance 80 is stainless steel. The porous plug 90 is ceramic. The drop shroud 95 is composed of a union 110 and a type B washer 120 with a center hole (not shown). The union 110 is inserted through washer 120 and the two welded together at the union shoulder 130. The porous plug 90, tube 80 and union 110 are each threaded for combining to form the assembly 130. Commercially available parts may be used for the drop shroud such as:

Washer 120: An ANSI Type B Washer with nominal size 1.5, Series W with inner diameter of 1.562 inches, outer diameter 4 inches and thickness 0.25 inches.

Union 110: A HYDRASUN™, 0.5 inch NPTF, stainless steel, alloy 316 union, part number 0038001620.

The drop shroud 95 could be made in several ways other ways. The drop shroud could for example be made as a machined piece, machined casting, or a welded assembly of a solid stainless NPT female coupling with a stainless ¼" (0.6 cm) thick disc with a center hole to accommodate the coupling.

WORKING EXAMPLE

Aluminum

In one SBAL™ experiment, a 1500 pound charge of 356 aluminum alloy was melted in a 1500 pound capacity gas fired furnace with lid. The SBAL™ lance setup and furnace cross section is similar to that shown in FIG. 1. Historical control data was used to evaluate SBAL™. The gas fired furnace tested has a standard two hour melt cycle under air. After the melt cycle, the molten 1500 pound aluminum bath would be purged with argon bubbles through a bottom porous plug or inserted porous graphite rod for an hour to remove gas. It would then be tested by vacuum solidification of a button sample. If the sample is gas free, the molten aluminum is suitable for casting. If it the sample is not gas free, more argon bubbling is required.

The experimental SBAL™ process protected an aluminum charge for a 1 hour and 45 minute melt cycle (faster than the historic control). With an average argon flow rate of 8 SCF per minute, the furnace environment had an average oxygen level of 690 parts per million. This low level of oxygen has not been achieved by simply blowing argon gas at various flow rates (the same or higher than the SBAL™ flow rate) through the lid or around the top lip of the furnace due to the engulfment of air that occurs with this approach.

At the end of the melt cycle, the molten surface of the aluminum revealed a 90 percent reduction in dross (aluminum oxide), when compared to air melted heats. Also, a 3 inch diameter×2 inch thick sample button of molten aluminum from the furnace was poured into a mold and solidified under vacuum to ascertain gas content. There was no evidence of gas at the top surface or in a magnified view of a cross section of the solid button. The 1500 pound molten heat of aluminum was suitable for casting.

From this experiment it was evident that the melt cycle time was reduced by 12.5 percent. This is due to less dross reduction while melting in an inert atmosphere. There was 90 percent less dross production over air melted heats resulting in a higher alloy melt cycle yield. And there was a complete elimination of the bubbling cycle to reduce gas in the aluminum. Overall, the SBAL™ process provided a 41.6 percent reduction in melt cycle time per 1500 pound batch of ready to cast molten 356 alloy over melting the same alloy in an air atmosphere.

This experiment was performed on three other separate occasions with essentially the same results.

Industrial Applicability

The methods herein are suitable for use in closed, indirect furnace melting of magnesium alloys for sand casting, investment casting, shell casting, permanent mold casting, and die-casting operations.

What is claimed is:

1. A method of providing an inerting atmosphere to a body of molten magnesium, lithium, zinc, silicon, aluminum or other metal or metal alloy in an indirect fired or resistance furnace using an inerting apparatus, the molten metal or metal alloy being reactive to air, water and/or other constituents in air, the method comprising the steps of:
   a) introducing a flow of an inerting gas through a nozzle within the furnace from a flow initiation position within the furnace that is:
      i) in a proximity of a surface of a solid metal charge or molten metal body in the furnace; and
   b) controlling a flow rate of the inerting gas flow through a nozzle to produce a laminar flow emanating from the flow initiation position and expanding across the solid metal charge or molten metal body surface, thereby backfilling of a volume from the surface of the molten and/or heated metal to a working lid of the melting furnace, thereby forming a gradient of reducing concentration in the vertical direction.

2. The method of claim 1 wherein the melting furnace is open to the external atmosphere for no more than a maximum period of time after which the surface of the molten and/or heated metal would experience a concentration level of air and/or other constituents in air that is higher than a predetermined maximum level.

3. The method of claim 1, wherein the molten metal body is a magnesium alloy.

4. The method of claim 1, wherein the predetermined maximum level is an oxygen concentration in the atmosphere in contact with the surface of the molten metal, the maximum being at or below 800 ppm.

5. The method of claim 1, wherein the molten metal body is an aluminum alloy.

6. The method of claim 5, wherein a predetermined maximum level is an oxygen concentration in the atmosphere in contact with the surface of the molten metal, the maximum being at or below 800 ppm.

7. The method of claim 1, wherein the inerting gas comprises argon.

8. The method of claim 1, wherein, prior to forming the flow, the inerting gas is at or below ambient temperature relative to the internal temperature of the melting furnace.

9. The method of claim 1, wherein the inerting gas flow emanates from a plurality of porous plugs at a plurality of flow initiation positions.

10. The method of claim 9, wherein the inerting gas is delivered to the porous plugs at a pressure of 137 kPa to 275 kPa.

11. The method of claim 1, wherein the maximum period the lid is open to the external atmosphere is from 1 to 3 minutes.

12. The method of claim 1, wherein the inert gas flow rate is 0.25 to 100 SCF per minute.

13. The method of claim 1, wherein the inert gas flow rate is increased when a lid of the inerting apparatus is in an open position.

14. The method of claim 1 wherein the inerting apparatus comprises:
   a. a supply of inerting gas;
   b. a porous plug;
   c. a tube in fluid communication with the inert gas supply and the porous plug and configured to transport inert gas from the supply to the porous plug; and
   d. a drop shroud fixed to the tube and the porous plug, the drop shroud disposed proximate the junction of the tube and the porous plug, wherein the drop shroud is configured to shield the porous plug from objects falling from above the porous plug.

15. The method of claim 14, wherein the porous plug has pores with diameters between 1 to 200 microns.

16. The method of claim 14, wherein the porous plug is in the proximity of the surface of the solid metal charge or molten metal body in the furnace.

17. The method of claim 14, wherein the porous plug comprises stainless steel and/or a ceramic material, the porous plug being configured to function at an operational temperature of an induction melting furnace.

18. The method of claim 14, wherein the drop shroud is configured such that the drop shroud directs the inerting gas flowing from the porous plug to flow along the surface of the solid metal charge or molten metal body in the furnace.

19. The method of claim 1, wherein the flow rate of the inerting gas is at a value which results in a laminar flow of the inerting gas across the surface of the solid metal charge or molten metal body in the furnace.

20. The method of claim 1, wherein the flow rate of the inerting gas is at a value which results in minimal turbulent flow of the inerting gas across the surface of the solid metal charge or molten metal body in the furnace such that engulfment of air is substantially eliminated.

21. A method of providing an inerting atmosphere to a body of molten metal or metal alloy in an indirect fired or resistance furnace, the molten metal or metal alloy being reactive to air, water and/or other constituents in air, the method comprising the steps of:
   introducing a flow of an inerting gas through a nozzle within the furnace from a flow initiation position within the furnace that is in a proximity of a surface of a solid metal charge or molten metal body in the furnace such that an inert gas blanket is formed above the surface of the solid metal charge or molten metal body,
   wherein the flow of the inerting gas is introduced having a low pressure to high flow ratio such that there is a substantial absence of engulfment of air from above the surface of the solid metal charge or molten metal body during the introduction step.

22. The method of claim 21, wherein the inerting gas is introduced at multiple flow initiation positions.

23. The method of claim 21, wherein the inert gas blanket backfills from the surface of the solid metal charge or molten metal body by displacing damaging constituents of the air away from said surface.

24. The method of claim 21, wherein the inerting gas is at a temperature substantially cooler than the air within the furnace that the inerting gas is displacing.

25. The method of claim 21, wherein the flow rate of the inerting gas is at a value which results in a laminar flow of the inerting gas across the surface of the solid metal charge or molten metal body in the furnace.

26. The method of claim 21, wherein the flow rate of the inerting gas is at a value which results in minimal turbulent flow of the inerting gas across the surface of the solid metal charge or molten metal body in the furnace such that engulfment of air is substantially eliminated.

27. The method of claim 21, wherein the flow rate of the inerting gas is between 0.25 to 100 SCF per minute.

28. The method of claim 21, wherein the flow rate of the inerting gas is between 1 to 30 SCF per minute.

* * * * *